(12) United States Patent
Kimata

(10) Patent No.: US 10,306,126 B2
(45) Date of Patent: May 28, 2019

(54) IMAGING APPARATUS AND IMAGE PROCESSING SYSTEM

(71) Applicant: DENSO CORPORATION, Kariya, Aichi-pref. (JP)

(72) Inventor: Tetsuya Kimata, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/809,509

(22) Filed: Nov. 10, 2017

(65) Prior Publication Data

US 2018/0139373 A1 May 17, 2018

(30) Foreign Application Priority Data

Nov. 11, 2016 (JP) .................................. 2016-220711

(51) Int. Cl.
| | |
|---|---|
| H04N 5/232 | (2006.01) |
| H04N 5/225 | (2006.01) |
| H04N 5/353 | (2011.01) |
| H04N 5/355 | (2011.01) |
| H04N 5/378 | (2011.01) |
| H04N 5/445 | (2011.01) |

(52) U.S. Cl.
CPC ....... *H04N 5/23203* (2013.01); *H04N 5/2258* (2013.01); *H04N 5/3535* (2013.01); *H04N 5/35554* (2013.01); *H04N 5/378* (2013.01); *H04N 5/44504* (2013.01)

(58) Field of Classification Search
CPC .................................................. H04N 5/23203
USPC ....................................................... 348/207.1
See application file for complete search history.

(56) References Cited

U.S. PATENT DOCUMENTS

| | | | |
|---|---|---|---|
| 2001/0030761 A1* | 10/2001 | Ideyama | ............... G06T 1/0028 |
| | | | 358/1.9 |
| 2006/0209316 A1* | 9/2006 | Toda | .................. H04N 1/00278 |
| | | | 358/1.1 |
| 2013/0021530 A1 | 1/2013 | Takahashi | |
| 2014/0218535 A1 | 8/2014 | Ihlenburg et al. | |
| 2017/0163867 A1 | 6/2017 | Ihlenburg et al. | |

FOREIGN PATENT DOCUMENTS

| | | |
|---|---|---|
| JP | H04-326887 A | 11/1992 |
| JP | 2013-026787 A | 2/2013 |
| JP | 2015-041792 A | 3/2015 |
| WO | 2013/043661 A1 | 3/2013 |

* cited by examiner

*Primary Examiner* — Joel W Fosselman
(74) *Attorney, Agent, or Firm* — Knobbe, Martens, Olson & Bear, LLP

(57) ABSTRACT

In an imaging apparatus, at least one imaging unit performs a capturing task to capture image data in accordance with control data. An embedding unit embeds, into the image data, condition data indicative of an operating condition of the imaging unit, thus generating embedded image data. A communication unit performs serial communications with an external device to thereby receiving the control data from the external device, and transmitting the embedded image data to the external device.

9 Claims, 6 Drawing Sheets

IMAGING APPARATUS AND IMAGE PROCESSING SYSTEM

CROSS REFERENCE TO RELATED APPLICATION

This application is based on and claims the benefit of priority from Japanese Patent Application No. 2016-220711 filed on Nov. 11, 2016, the disclosure of which is incorporated in its entirety herein by reference.

TECHNICAL FIELD

The present disclosure relates to imaging apparatuses for transmitting and/or receiving data to and/or from external devices, and image processing systems including such an imaging apparatus.

BACKGROUND

Typical imaging apparatuses, which are for example installable in a vehicle, are configured to use serial communications to communicate with external devices.

For example, such an imaging apparatus includes an imaging unit. The imaging apparatus is configured to transmit image data captured by the imaging unit to external devices via serial communications.

In addition, the imaging apparatus is configured to receive, from external devices via serial communications, control data for controlling the imaging unit, and transmit, to external devices, condition data indicative of the operating parameters of the imaging unit.

International Unexamined Patent Application No. 2013/043661 discloses such an imaging apparatus configured to transmit frames, i.e. frame images, at predetermined intervals, i.e. predetermined vertical blanking intervals. That is, the vertical blanking interval represents a period during which no frames are transmitted from the imaging apparatus to an external device.

In particular, the imaging apparatus is configured to communicate, with an external device, such control data and/or such condition data during at least one of the vertical blanking intervals.

SUMMARY

The vertical blanking interval is set to be short to increase the number of transmitted frames per unit of time. This may unfortunately result in the amount of data transmittable during the vertical blanking interval being limited. For this reason, when an external device is operative to receive the condition data to thereby check whether the operating parameters of the imaging unit are normal, the range of the operating parameters being checked may be restricted due to the limited amount of the control data to be received.

In view of the circumstances set forth above, one aspect of the present disclosure seeks to provide imaging apparatuses with an imaging unit, which are capable of addressing the problem set forth above.

Specifically, an alternative aspect of the present disclosure aims to provide such imaging apparatuses, each of which enables a larger amount of data to be communicated between the imaging apparatus and an external device.

A further aspect of the present disclosure aims to provide image processing systems, each of which is capable of communicating a larger amount of data between an imaging apparatus and an external device.

According to a first exemplary aspect of the present disclosure, there is provided an imaging apparatus. The imaging apparatus includes at least one imaging unit configured to perform a capturing task to capture image data in accordance with control data, and an embedding unit configured to embed, into the image data, condition data indicative of an operating condition of the imaging unit, thus generating embedded image data. The imaging apparatus includes a communication unit configured to perform serial communications with an external device to thereby receive the control data from the external device, and transmit the embedded image data to the external device.

According to a second exemplary aspect of the present disclosure, there is provided an image processing system. The image processing system includes an imaging apparatus, an external device, and a communication line communicably connecting between the imaging apparatus and the external device. The imaging apparatus includes at least one imaging unit configured to perform a capturing task to capture image data in accordance with at least one value of control data, and an embedding unit configured to embed, into the image data, condition data indicative of an operating condition of the imaging unit, thus generating embedded image data. The imaging apparatus includes a communication unit configured to perform serial communications with the external device via the communication line to thereby receive the control data from the external device, and transmit the embedded image data to the external device. The external device includes a separator configured to receive the embedded image data; and separate the condition data from the embedded image data.

This configuration of the imaging apparatus according to each of the first and second exemplary aspects enables the condition data indicative of the operating condition of the at least one imaging unit to be transmitted from the imaging apparatus to the external device via the serial communications without using vertical blanking intervals. This enables a larger amount of the control data to be transmitted from the imaging apparatus to the external device without no limitation of the length of each of the vertical blanking intervals.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

The following describes embodiments of the present disclosure with reference to the accompanying drawings.

The following describes an image processing system 1 according to the first embodiment of the present disclosure with reference to FIGS. 1 to 4.

Figure 1:
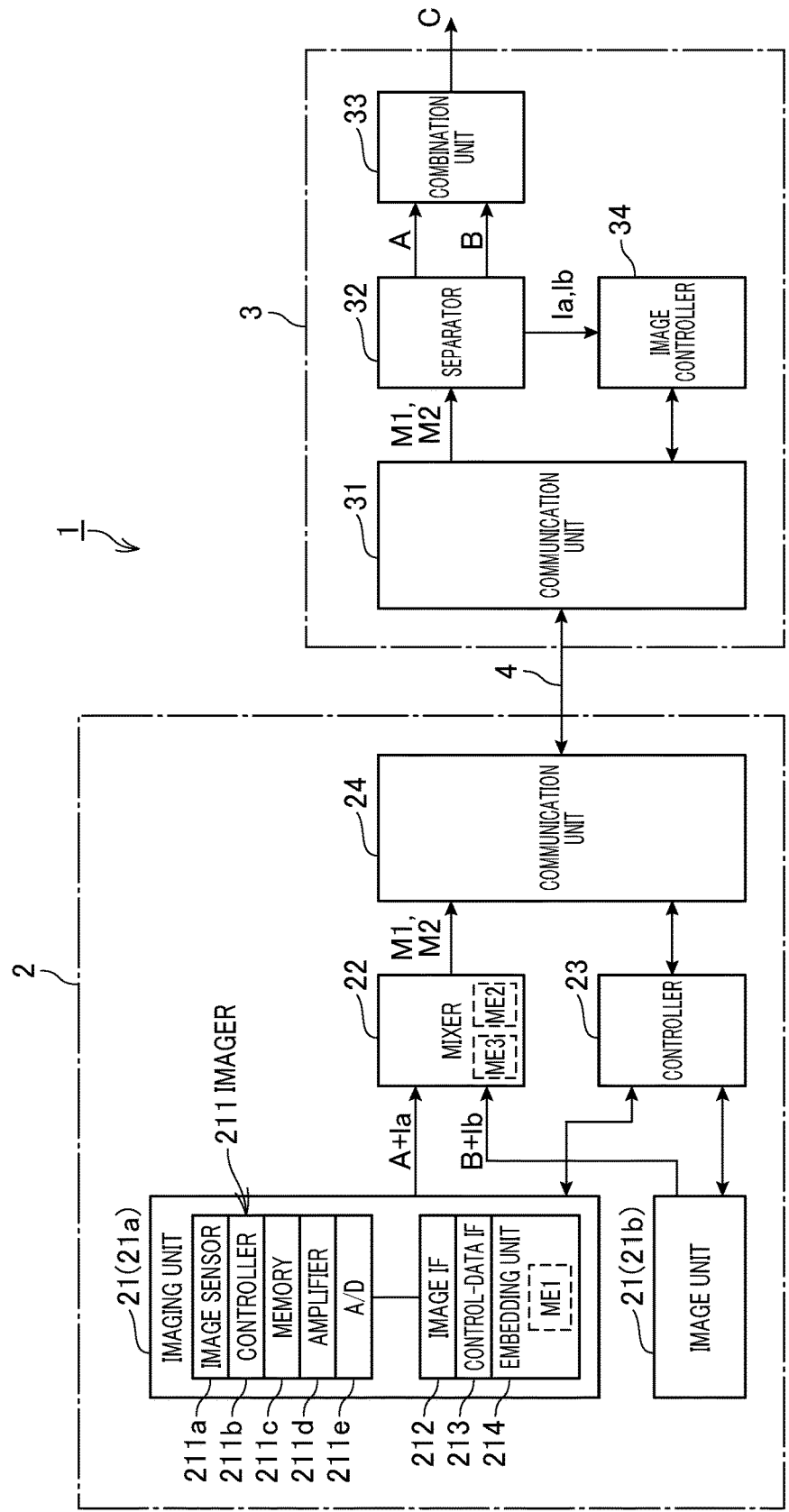
FIG. 1 is a block diagram schematically illustrating an example of the overall structure of an image processing system according to the first embodiment of the present disclosure.
Figure 2:
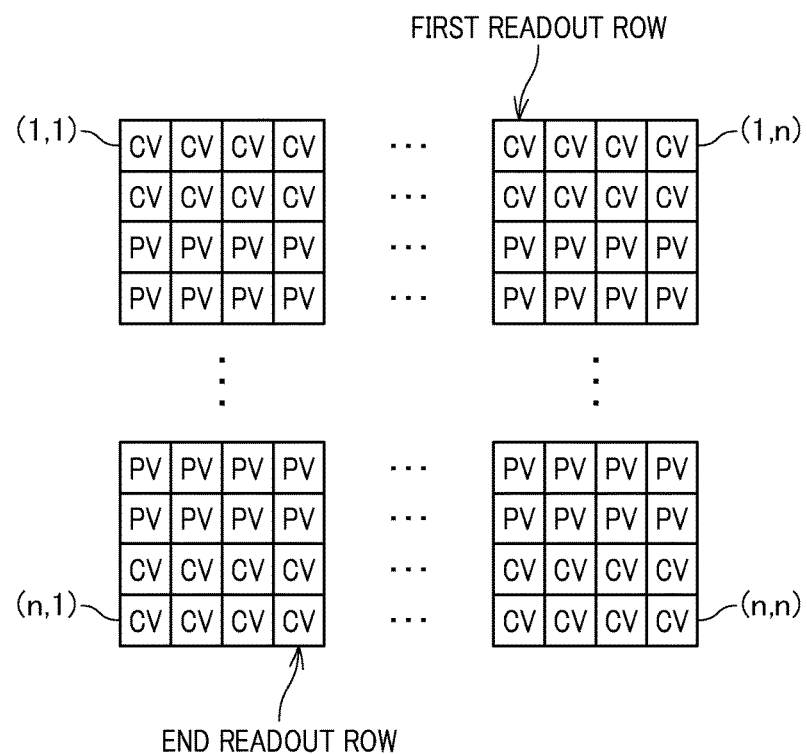
FIG. 2A is a diagram schematically illustrating an example of a pixel arrangement of a frame image according to the first embodiment.
FIG. 2B is a diagram schematically illustrating that a part of frame image data has been replaced with condition data according to the first embodiment.

Referring to FIG. 1, the image processing system 1 includes an imaging apparatus 2, an image processor 3, and a communication line 4. The communication line 4 communicably connects between the imaging apparatus 2 and the image processor 3, and enables serial communications to be established between the imaging apparatus 2 and the image processor 3. The serial communications between first and second devices are configured such that one of the first and second devices sends data one bit at a time sequentially over a communication channel, such as the communication line 4, to the other thereof. A twisted pair cable or a coaxial cable can be used as the communication line 4.

The imaging apparatus 2 includes at least two imaging units 21, a mixer 22, a controller 23, and a communication unit 24. Hereinafter, the imaging apparatus 2 according to the first embodiment includes two imaging units 21.

For example, each of the imaging units 21 is configured to capture a common scene in front of the corresponding camera.

The imaging units 21 have the same structure to each other, so that the following describes only one of the imaging units 21.

The imaging unit 21 is comprised of an imager 211, an image interface (IF) 212, a control-data interface (IF) 213, and an embedding unit 214.

The imager 211 includes an image sensor 211a, such as a known charge-coupled device (CCD) image sensor or a complementary metal-oxide-semiconductor (CMOS) image sensor. The image sensor 211a is comprised of light-sensitive elements each including a CCD device or CMOS switch; the light-sensitive elements serve as pixels and are arranged in a two-dimensional array. That is, the array of the pixels is configured as a predetermined number of columns by a predetermined number of rows. The two-dimensionally arranged pixels constitute an imaging area on which light incident to the image sensor is received.

The imager 211 also includes a controller 211b and a memory 211c. The controller 211b controls the image sensor 211a in accordance with control data stored in the memory 211c to perform a capturing task that captures, for an image capturing cycle, a frame image of the scene based on light incident to the imaging area such that each of the two-dimensionally arranged light-sensitive elements (pixels) receives a corresponding component of light during a shutter time, i.e. an exposure time or at a shutter speed. That is, the imager 211 periodically performs the image capturing cycle to periodically capture the frame images at a predetermined frame rate.

Each of the two-dimensionally arranged light-sensitive elements is also configured to convert the intensity or luminance level of the received light component into an analog pixel value or an analog pixel signal, i.e. an analog pixel voltage signal, that is proportional to the luminance level of the received light component.

The imager 211 also includes an amplifier 211d configured to obtain, from the image sensor 211a, the pixel signals, i.e. pixel values, each representing the luminance level of the corresponding pixel as an image, i.e. a frame image. Then, the amplifier 211d is configured to amplify the pixel values of the frame image by an analog gain.

The imager 211 further includes an analog-to-digital (A/D) converter 211e configured to convert the analog pixel signals (analog pixel values) of the frame image amplified by the amplifier 211d into digital pixel signals (digital pixel values) based on a predetermined bit width, i.e. the number of bits.

The image interface 212 is configured to horizontally scan, i.e. read out, the digital pixel values of the frame image, i.e. frame image data, pixel by pixel and row by row from the left upper pixel to the right lower pixel, thus transferring the frame image data to the embedding unit 214.

For example, as illustrated in FIG. 2A, the frame image is comprised of n×n pixels where n is an integer equal to or more than 2, and the addresses from (1, 1) to (n, n) are respectively assigned to the n×n pixels from the left upper pixel to the right lower pixel. That is, the pixels of the uppermost row, i.e. the first row, are assigned to the respective addresses of (1, 1) to (1, n), . . . , and the pixels of the lowermost row, i.e. the n-th row, are assigned to the respective addresses of (n, 1) to (n, n).

The image interface 212 is configured to successively read out the digital pixel values of the frame image data pixel by pixel from the uppermost row, i.e. first row, (1, 1) to (1, n) to the lowermost row (n, 1) to (n, n). The uppermost row will be therefore referred to as a first readout row of the frame image data, and the lowermost row will be therefore referred to as an end readout row of the frame image data.

Note that the image interface 212 can be configured to output the analog pixel values of the frame image row by row or pixel by pixel, thus outputting an analog frame image. Then, the amplifier can be configured to amplify the analog pixel values of the frame image, and the A/D converter can be configured to convert the analog pixel values of the frame image amplified by the amplifier, thus outputting frame image data.

The control-data interface 213 is configured to update commanded values of the control data previously stored in the memory 211b to commanded values of the control data newly sent from the controller 23. The control data includes a commanded value of the shutter time, a commanded value of the analog gain, and a commanded value of a white balance, i.e. gray balance, of a frame image to be captured.

The embedding unit 214 has a memory ME1 for each of the pixels of the frame image, and is configured to receive the digital pixel values of the frame image data transferred from the image interface 212, and store the digital pixel values in the respective memories ME1. That is, the frame image data is stored in the memories ME1.

In addition, the embedding unit 214 is configured to detect the operating conditions, i.e. operating parameters of the imager 211, convert the operating parameters of the imager 211 into condition data comprised of digital data values, and embed the condition data into the frame image data stored in the memories ME1.

For example, the embedding unit 214 select pixels in the frame image data stored in the memories ME1, and replaces the digital pixel values of the selected pixels with the digital data values of the condition data; the selected pixels are located at, for example, the perimeter of the frame image data.

For example, as illustrated in FIG. 2B, the embedding unit 214 can replace (1) The digital pixel values of several rows, such as two rows (header portion), from the first readout row (1, 1) to (1, n) in the frame image data with the digital data values (see reference character CV) of the condition data (2) The digital pixel values of several rows, such as two rows (end portion), from the end readout row (n, 1) to (n, n) in the frame image data with the digital data values (see reference character CV) of the condition data or (3) Both the digital pixel values of several rows, such as two rows, from the first readout row (1, 1) to (1, n) and the digital pixel values of several rows, such as two rows, from the end readout row (n, 1) to (n, n) in the frame image data with the digital data values (see reference character CV) of the condition data In FIG. 2B, the digital pixel values of the remaining pixels will be represented as reference character PV.

Note that the embedding unit 214 can prepend, as at least one readout row, the digital data values of the condition data to the first readout row in the frame image data, and/or append, as at least one readout column, the digital data values of the condition data to the end readout row in the frame image data.

Thereafter, the embedding unit 214 is configured to output the frame image data to the mixer 22.

That is, each of the two imaging units 21 is configured to output the frame image data to the mixer 22.

Hereinafter, the two imaging units 21 will be represented as first and second imaging units 21a and 21b, the frame image data output from the imager 211 of the first imaging unit 211a will be referred to as frame image data A, and the frame image data output from the imager 211 of the second imaging unit 21b will be referred to as frame image data B. Additionally, the condition data indicative of the operating conditions of the imager 211 of the first imaging unit 21a will be referred to as condition data Ia, and the condition data indicative of the operating conditions of the imager 211 of the second imaging unit 21b will be referred to as condition data Ib.

This definition enables the frame image data output from the embedding unit 214 of the first imaging unit 21a, in which the condition data Ia is embedded, to be represented as first image data (A+Ia). Similarly, this definition enables the frame image data output from the embedding unit 214 of the second imaging unit 21b, in which the condition data Ib is embedded, to be represented as second image data (B+Ib).

The mixer 22 has memories, i.e. frame memories, ME2 and ME3. Each of the frame memories ME2 and ME3 has a storage region having addresses corresponding to the respective pixels of the corresponding one of the first frame image data (A+Ia) and the second frame image data (B+Ib).

The mixer 22 is configured to mix the first image data (A+Ia) and the second image data (B+Ib) with each other to generate first embedded image data M1 and second embedded image data M2, and supply the first embedded image data M1 and second embedded image data M2 to the communication unit 24.

For example, the mixer 22 divides the first image data (A+Ia) into six image data segments A1 to A6 each containing a predetermined number of rows. That is, the sum of the rows of the respective image data segments A1 to A6 corresponds to the total number of rows of the first image data (A+Ia).

Figure 3:
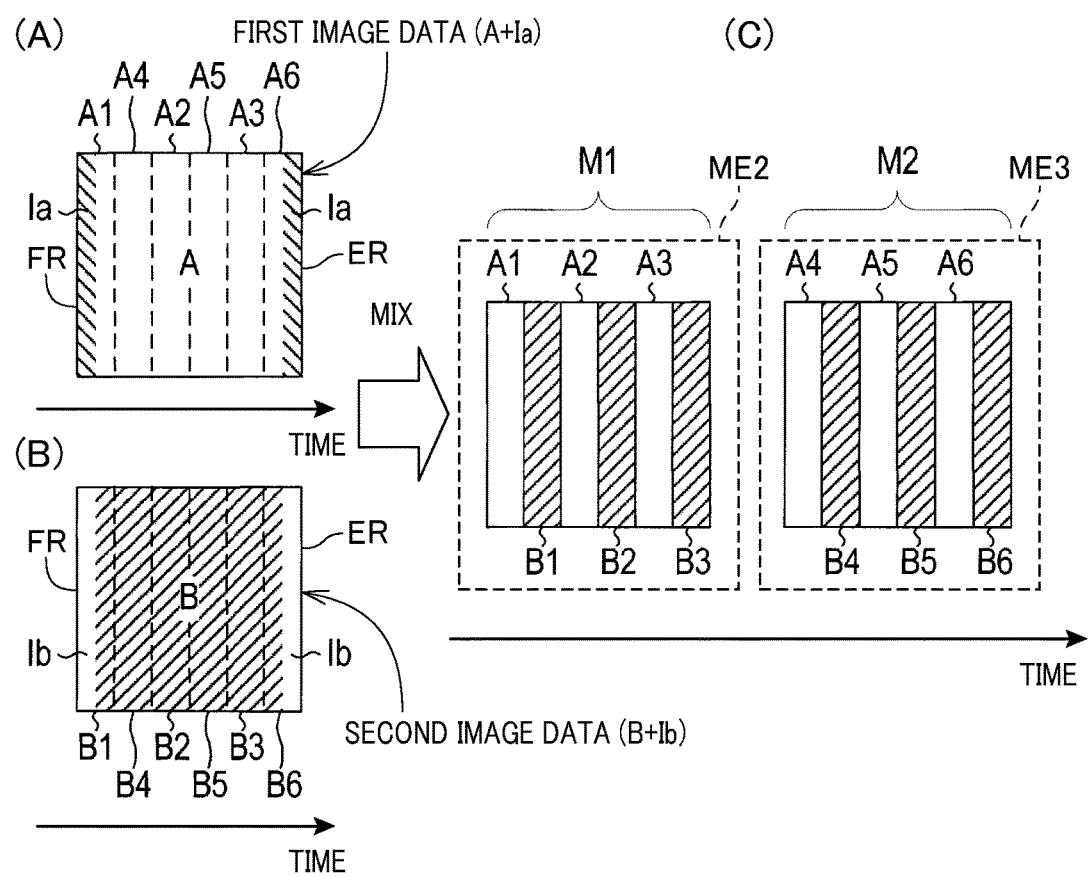
FIG. 3 is a diagram schematically illustrating how a mixer illustrated in FIG. 1 mixes first image data with second image data according to the first embodiment.

Reference character (A) of FIG. 3 schematically illustrates the first image data (A+Ia) stored in the memories ME1. Because the mixer 22 is configured to read out the first image data (A+Ia) from the uppermost row, i.e. first readout row (see reference character FR), to the lowermost row, i.e. the end readout row (see reference character ER), the first readout row FR is read out first, and the end readout row ER is read out last. Reference character (A) of FIG. 3 illustrates the rows of the first image data (A+Ia) in time axis, i.e. chronological order, so that the firstly readout row FR is arranged at the leftmost, and the lastly readout row ER is arranged at the rightmost.

In particular, as illustrated in reference character (A) of FIG. 3, the data segment A1 includes a predetermined number of rows from the first readout row FR including the condition data Ia, and the data segment A6 includes a predetermined number of rows from the end readout row ER including the condition data Ia. The data segments A1 to A6 are arranged from the first readout row FR to the end readout row ER in the order of A1, A4, A2, A5, A3, and A6.

Similarly, the mixer 22 divides the second image data (B+Ib) into six image data segments B1 to B6 each containing a predetermined number of columns. That is, the sum of the columns of the respective image data segments B1 to B6 corresponds to the total number of columns of the second image data (B+Ib).

Reference character (B) of FIG. 3 schematically illustrates the second image data (B+Ib) stored in the memories ME1. Because the mixer 22 is configured to read out the frame image data from the uppermost row, i.e. first readout row (see reference character FR), to the lowermost row, i.e. the end readout row (see reference character ER), the first readout row FR is read out first, and the end readout row ER is read out last. Reference character (B) of FIG. 3 illustrates the rows of the second image data (B+Ib) in time axis, i.e. chronological order, so that the firstly readout row FR is arranged at the leftmost, and the lastly readout row ER is arranged at the rightmost.

In particular, as illustrated in reference character (B) of FIG. 3, the data segment B1 includes a predetermined number of rows from the first readout row FR including the condition data Ib, and the data segment B6 includes a predetermined number of rows from the end readout row ER including the condition data Ib. The data segments B1 to B6 are arranged from the first readout row FR to the end readout row ER in the order of B1, B4, B2, B5, B3, and B6.

Note that the number of division of each of the first image data (A+Ia) and the second image data (B+Ib) can be set to an integer value, which is other than 6, equal to or greater than 2.

Then, the mixer 22 performs the following first mixing procedure to (1) Selectively read out the data segment A1 from the first image data (A+Ia) to thereby store the data segment A1 in the corresponding portion, which will be referred to as a first portion, of the storage region of the frame memory ME2

(2) Selectively read out the data segment B1 from the second image data (B+Ib) to thereby store the data segment B1 in a second portion of the storage region of the frame memory ME2; the second portion is adjacently aligned with the first portion (3) Selectively read out the data segment A2 from the first image data (A+Ia) to thereby store the data segment A2 in a third portion of the storage region of the frame memory ME2; the third portion is adjacently aligned with the second portion (4) Selectively read out the data segment B2 from the second image data (B+Ib) to thereby store the data segment B2 in a fourth portion of the storage region of the frame memory ME2; the fourth portion is adjacently aligned with the third portion (5) Selectively read out the data segment A3 from the first image data (A+Ia) to thereby store the data segment A3 in a fifth portion of the storage region of the frame memory ME2; the fifth portion is adjacently aligned with the fourth portion (6) Selectively read out the data segment B3 from the second image data (B+Ib) to thereby store the data segment B3 in a sixth portion of the storage region of the frame memory ME2; the sixth portion is adjacently aligned with the fifth portion This enables the first embedded image data M1 comprised of the data segments A1, B1, A2, B2, A3, and B3 to be generated in the storage region of the frame memory ME2.

That is, the mixer 22 is configured to perform multiple alternate selections of one of the data segments A1 to A3 in this order and the data segments B1 to B3 in this order, and mix the selected data segments A1 to A3 with the selected respective data segments B1 to B3. This enables the first embedded image data M1 comprised of the data segments A1, B1, A2, B2, A3, and B3 to be generated in the storage region of the frame memory ME2.

The mixer 22 also performs a second mixing procedure based on the remaining data segments A4, B4, A5, B5, A6, and B6 in the same manner as the first mixing procedure using the data segments A1, B1, A2, B2, A3, and B3 set forth above. This enables the second embedded image data M2 comprised of the data segments A4, B4, A5, B5, A6, and B6 to be generated in the storage region of the frame memory ME3.

The controller 23 is configured to receive the control data sent from the image processor 3, which serves as an example of an external device, via the communication unit 24; the control data includes, for example, the commanded values of the respective shutter time, the analog gain, and the white balance as described above. Then, the controller 23 is configured to cause the control-data interface 213 to update commanded values of the shutter time, the analog gain, and the white balance which have been stored in the memory 211b to the commanded values of the control data sent from the image processor 3 via the communication unit 24 for a next frame image to be captured. Note that the shutter time used by the first imaging unit 21a will also be referred to as a first shutter time, and the shutter time used by the second imaging unit 21b will also be referred to as a second shutter time. The first shutter time and the second shutter time according to the first embodiment are determined such that the first shutter time is longer than the second shutter time.

The controller 23 is also configured to receive a readout instruction sent from the image processor 3 via the communication unit 24, and read out, as a response, one of the condition data Ia of the first imaging unit 21a and the condition data Ib of the second imaging unit 21b, which is specified by the readout instruction. Then, the controller 23 is configured to supply the response to the communication unit 24.

The communication unit 24 performs serial communications with the image processor 3 via the communication line 4.

Specifically, the communication unit 24 is configured to receive, via the communication line 4, the control data sent from the image processor 3, and transfer the received control data to the controller 23.

The communication unit 24 is also configured to

1. Alternately read out one of the first embedded image data M1 and the second embedded image data M2

2. Transmit, to the image processor 3 via the communication line 4, one of the first embedded image data M1 and the second embedded image data M2 alternately read out.

The imaging apparatus 2 is configured to perform

1. A first task of capturing the image data A based on light received by the first imaging unit 21a during the first shutter time and capture the image data B based on light received by the second imaging unit 21b during the second shutter time 2. A second task of embedding the condition data Ia into the image data A to generate the first image data (A+Ia), and embedding the condition data Ib into the image data B to generate the second image data (B+Ib)

3. A third task of scanning, i.e. transferring, the digital pixel values of each of the first image data (A+Ia) and the second image data (B+Ib) in a predetermined transfer time to thereby generate the corresponding one of the first embedded image data M1 and the second embedded image data M2

4. After lapse of a predetermined time interval, which is referred to as a vertical blanking interval VBlank, since completion of the transfer of each of the first image data (A+Ia) and the second image data (B+Ib), repeat the first to third tasks, thus obtaining the embedded frames each being comprised of one of the first embedded image data M and the second embedded image data M2

Figure 4:
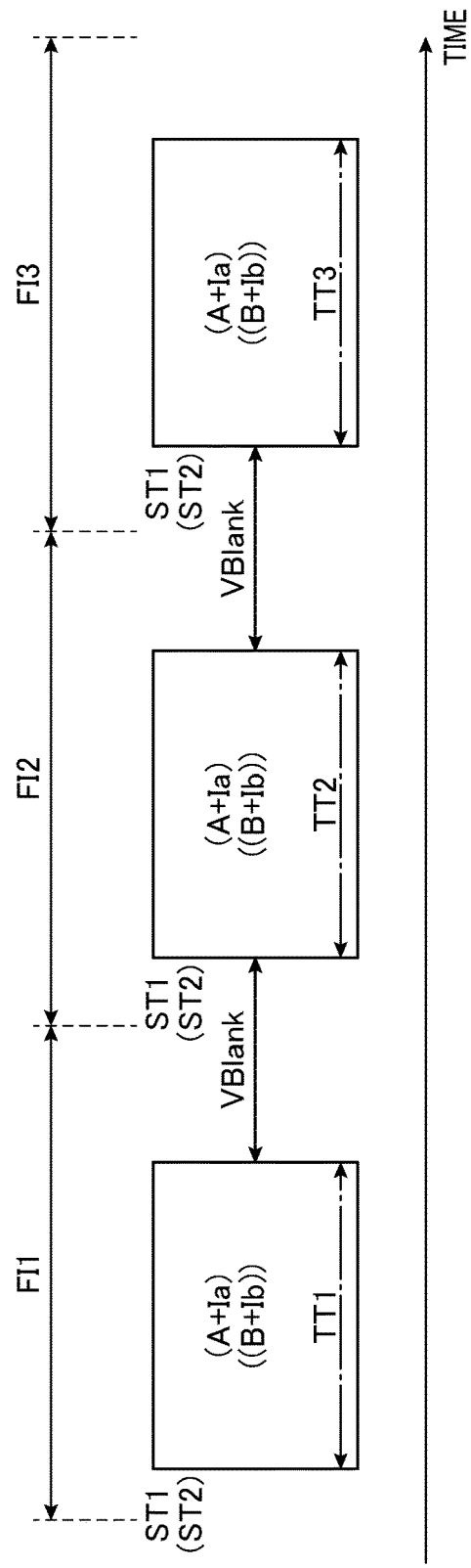
FIG. 4 is a block diagram schematically illustrating an example of the relationship among frame intervals, transfer times, a first shutter time, and vertical blanking intervals according to the first embodiment.

FIG. 4 schematically illustrates the relationship among frame intervals (see reference characters FI1, FI2, and FI3) of each of the first image data (A+Ia) and the second image data (B+Ib) defined based on the frame rate, the transfer times (see reference character TT1, TT2, and TT3), the first or second shutter time (see reference character ST1 or ST2), and the vertical blanking intervals VBlank.

That is, as described later, the image processor 3 is configured to periodically send, to the imaging apparatus 2, the control data such that each piece of the control data is located within a corresponding one of the vertical blanking intervals VBlank. Similarly, as described later, the image processor 3 is configured to send, to the imaging apparatus 2, the readout instruction such that the readout instruction is located within a selected one of the vertical blanking intervals VBlank.

The communication unit 24 is therefore configured to receive the control data within each of the vertical blanking intervals VBlank via the communication line 4, thus transferring the control data to the controller 23. The communication unit 24 is also configured to receive the readout instruction within one of the vertical blanking intervals VBlank via the communication line 4, thus transferring the readout instruction to the controller 23. The communication unit 24 is further configured to receive the response from the controller 23, and transmit the response to the image processor 3 via the communication line 4 within one of the vertical blanking intervals VBlank.

The image processor 3 includes a communication unit 31, a separator 32, a combination unit 33, and an imaging controller 34.

The communication unit 31 performs serial communications with the imaging apparatus 2 via the communication line 4.

Specifically, the communication unit 31 is configured to receive the first embedded image data M or the second embedded image data M2 sent from the imaging apparatus 2 via the communication line 4, and transfer the received first embedded image data M1 or the second embedded image data M2 to the separator 32.

When receiving the control data or the readout instruction from the image controller 34 within a vertical blanking interval VBlank, the communication unit 31 is configured to transmit the control data or the readout instruction to the imaging apparatus 2 via the communication line 4 within the vertical blanking interval VBlank. When receiving the control data or the readout instruction from the image controller 34 outside each vertical blanking interval VBlank, the communication unit 31 is configured to transmit the control data or the readout instruction to the imaging apparatus 2 via the communication line 4 within the next vertical blanking interval VBlank.

When receiving the response sent from the imaging apparatus 2 via the communication line 4, the communication unit 31 is configured to transfer the received response to the image controller 34.

When receiving the first embedded image data M1 transferred from the communication unit 31, the separator 32 is configured to 1. Separate the first embedded image data M1 into the data segments A1, B1, A2, B2, A3, and B3

2. Separate the condition data Ia embedded in, for example, the data segment A1 from the data segment A1, and the condition data Ib embedded in, for example, the data segment B1 from the data segment B1

3. Successively transfer the separated data segments A1, B1, A2, B2, A3, and B3 to the combination unit 33

4. Transfer the condition data Ia and the condition data Ib to the image processor 34

Note that the separator 32 is capable of transferring the data segment A1, in which the condition data Ia is embedded or from which the condition data Ia has been removed, to the combination unit 33, and transferring the data segment B1, in which the condition data Ib is embedded or from which the condition data Ib has been removed, to the combination unit 33.

Similarly, when receiving the second embedded image data M2 transferred from the communication unit 31, the separator 32 is configured to 1. Separate the second embedded image data M2 into the data segments A4, B4, A5, B5, A6, and B6

2. Separate the condition data Ia embedded in, for example, the data segment A6 from the data segment A6, and the condition data Ib embedded in, for example, the data segment B6 from the data segment B6

3. Successively transfer the separated data segments A4, B4, A5, B5, A6, and B6 to the combination unit 33

4. Transfer the condition data Ia and the condition data Ib to the image processor 34

Note that the separator 32 is capable of transferring the data segment A6, in which the condition data Ia is embedded or from which the condition data Ia has been removed, to the combination unit 33, and transferring the data segment B6, in which the condition data Ib is embedded or from which the condition data Ib has been removed, to the combination unit 33.

The separator 32 can be configured to

1. Extract, from the separated data segments A1 to A6, first image information indicative of, for example, the average luminance level of the frame image data A; the first image information depends on the control data for the first imaging unit 21a 2. Transfer the first image information to the image controller 34 together with the condition data Ia Similarly, the separator 32 can be configured to 1. Extract, from the separated data segments B1 to B6, second image information indicative of, for example, the average luminance level of the frame image data B; the second image information depends on the control data for the second imaging unit 21b 2. Transfer the second image information to the image controller 34 together with the condition data Ib The combination unit 33 is configured to receive the separated data segments A1, B1, A2, B2, A3, B3, A4, B4, A5, B5, A6, and B6 transferred from the separator 32.

Then, the combination unit 33 is configured to perform a high-dynamic range (HDR) combination task to combine the data segment A1 with the data segment B1.

Specifically, the HDR combination task is configured to

1. Divide the total luminance-level range of the data segments A1 and B1 into at least two different first and second luminance-level ranges; the second luminance-level range is higher than the first luminance-level range 2. Combine the digital pixel values of the data segments A1 and B1 such that a relationship between each luminance level and a corresponding digital pixel value within the first luminance-level range in the data segments A1 and B1 is different from a relationship between each luminance level and a corresponding digital pixel value within the second luminance-level range in the data segments A1 and B1. This HDR combination task generates a partial HDR composite image (see HDR combination task in FIG. 5).

Figure 5:
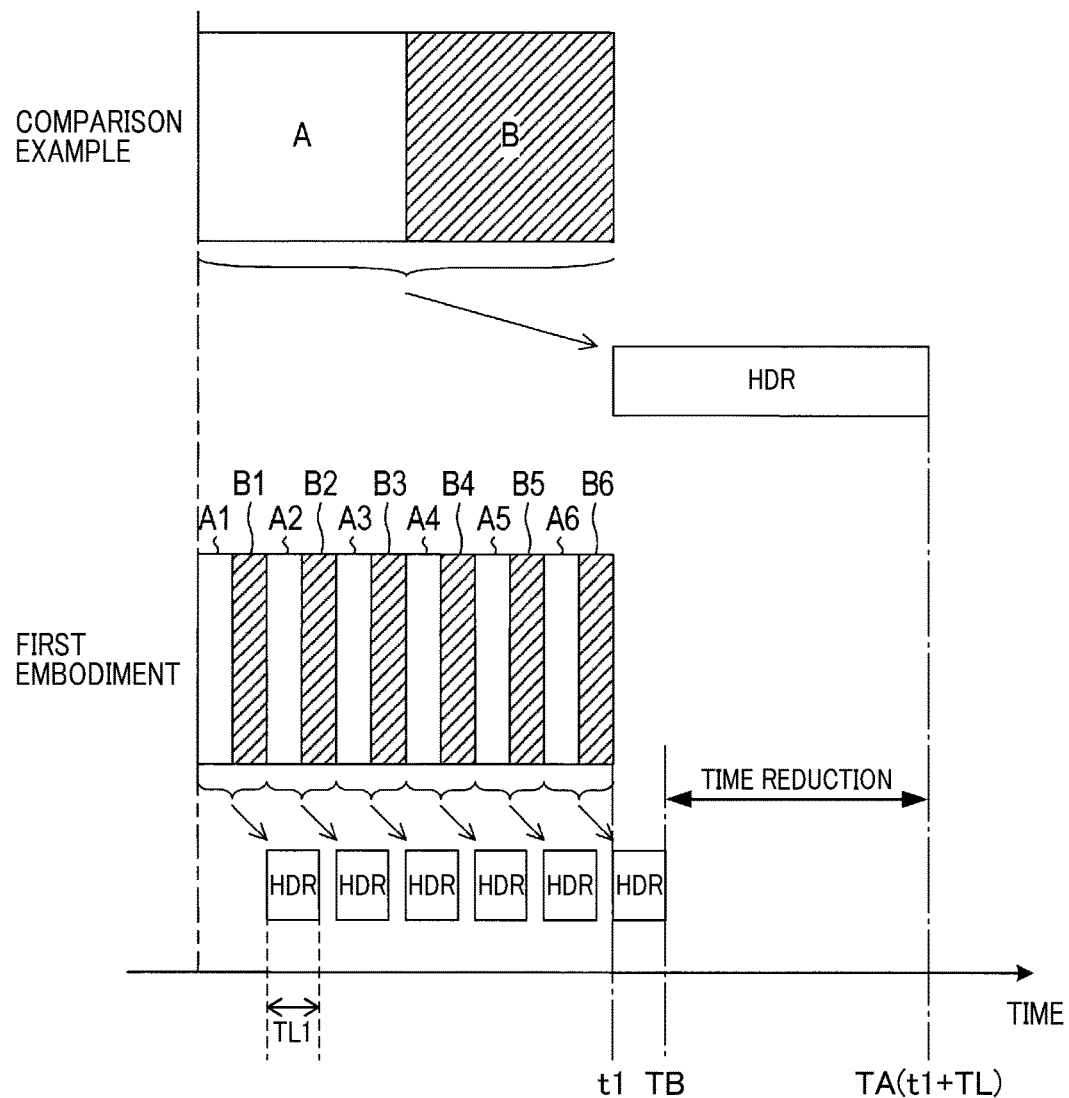
FIG. 5 is a diagram schematically illustrating an advantageous effect achieved by the mixer according to the first embodiment.

The combination unit 33 is configured to perform the HDR combination task to combine the digital pixel values of data segments A2 and B2 in the same manner as the HDR combination task for the data segments A1 and B1, thus generates a partial HDR composite image (see HDR combination task in FIG. 5).

Similarly, the combination unit 33 is configured to perform the HDR combination task to combine the digital pixel values of data segments A3 and B3 in the same manner as the HDR combination task for the data segments A1 and B1, thus generates a partial HDR composite image (see HDR combination task in FIG. 5).

In addition, the combination unit 33 is configured to perform the HDR combination task to combine the data segment A4 with the data segment B4 in the same manner as combination of the data segments A1 and B1, thus generates a partial HDR composite image (see HDR combination task in FIG. 5).

Similarly, the combination unit 33 is configured to perform the HDR combination task to combine the data segment A5 captured during the first shutter time with the data segment B5 captured with the second shutter time in the same manner as combination of the data segments A1 and B1, thus generates a partial HDR composite image (see HDR combination task in FIG. 5). Additionally, the combination unit 33 is configured to perform the HDR combination task to combine the data segment A6 captured during the first shutter time with the data segment B6 captured with the second shutter time in the same manner as combination of the data segments A1 and B1, thus generates a partial HDR composite image (see HDR combination task in FIG. 5).

Thereafter, the combination unit 33 combines the partial HDR images, which are generated based on the data segments A1 to A6 and B1 to B6, with each other to thereby generate an HDR composite image C whose dynamic range is wider than each of the frame image data A and the frame image data B. Thereafter, the combination unit 33 outputs the HDR composite image data C to an external circuit, such as an electronic control unit (ECU).

The image controller 34 is configured to receive at least one of the condition data Ia, the condition data Ib, the first image information, and the second image information separated from one of the first embedded image data M1 and the second embedded image data M2 by the separator 32 and supplied from the separator 32; one of the first embedded image data M1 and the second embedded image data M2 is based on the frame image data A and the frame image data B captured in a current image capturing cycle.

Then, the image controller 34 is configured to determine, based on, for example, the condition data Ia, commanded values of the control data used for the imaging unit 21a to capture a next frame image in the next image capturing cycle. Similarly, the image controller 34 is configured to determine, based on, for example, the condition data Ib, commanded values of the control data used for the imaging unit 21b to capture a next frame image in the next image capturing cycle. The image controller 34 is also configured to transmit the control data for each of the imaging units 21a and 21b for the next image capturing cycle to the imaging apparatus 2 via the communication unit 31 within the vertical blanking interval VBlank appearing after one of the first embedded image data M1 and the second embedded image data M2.

Additionally, the image controller 34 is configured to check whether each of the imaging units 21a and 21b is operating normally in accordance with the commanded values of the control data supplied to the corresponding imaging unit therefrom.

In addition, the image controller 34 is configured to send, to the imaging apparatus 2, the readout instruction within a selected one of the vertical blanking intervals VBlank via the communication unit 31, and receive a response to the readout instruction sent from the imaging apparatus 2 thereto via the communication unit 31 within one of the vertical blanking interval VBlank.

Note that the function of each of the functional modules 212, 213, 214, 22, 23, and 24 of the imaging apparatus 2 can be implemented by at least one hardware unit. For example, if the function of each of the functional modules 212, 213, 214, 22, 23, and 24 is implemented by an electronic circuit as such a hardware unit, the electronic circuit can be implemented by at least one digital circuit including many logic circuits, at least one analog circuit, or at least one analog and digital hybrid circuit. Each of the functional modules 212, 213, 214, 22, 23, and 24 can be implemented by at least one microcomputer circuit including a CPU and a memory, such as a semiconductor memory; the semiconductor memory is at least one of a RAM, a ROM, and a flash memory. The semiconductor memory is an example of a non-transitory storage medium. If each of the functional modules 212, 213, 214, 22, 23, and 24 is implemented by at least one microcomputer circuit including a CPU and a memory, the CPU is configured to run at least one program stored in the memory, thus implementing functions of the respective functional modules 212, 213, 214, 22, 23, and 24, or thus carrying out a method based on the at least one program.

Similarly, the function of each of the functional modules 31, 32, 33, and 34 of the image processor 3 can be implemented by at least one hardware unit. For example, if the function of each of the functional modules 31, 32, 33, and 34 is implemented by an electronic circuit as such a hardware unit, the electronic circuit can be implemented by at least one digital circuit including many logic circuits, at least one analog circuit, or at least one analog and digital hybrid circuit. Each of the functional modules 31, 32, 33, and 34 can be implemented by at least one microcomputer circuit including a CPU and a memory, such as a semiconductor memory; the semiconductor memory is at least one of a RAM, a ROM, and a flash memory. The semiconductor memory is an example of a non-transitory storage medium. If each of the functional modules 31, 32, 33, and 34 is implemented by at least one microcomputer circuit including a CPU and a memory, the CPU is configured to run at least one program stored in the memory, thus implementing functions of the respective functional modules 31, 32, 33, and 34, or thus carrying out a method based on the at least one program.

The following describes how the image processing system 1 according to the first embodiment operates, and also describes advantageous effects achieved by the image processing system 1.

As described above, the imaging apparatus 2 of the image processing system 1 transmits each of 1. The first embedded image data M1 embedded with the condition data Ia indicative of the operating conditions of the first imaging unit 21a

2. The second embedded image data M2 embedded with the condition data Ib indicative of the operating conditions of the second imaging unit 21b

This enables each of the condition data Ia and condition data Ib, which is required to determine commanded values of the control data for a frame image to be captured by the corresponding one of the first and second imaging units 21a and 21b, to be transmitted from the imaging apparatus 2 to the image processor 3 though the communication line 4 as an example of faster serial communication channel without using the vertical blanking intervals VBlank. This enables a larger amount of control data to be communicated from the imaging apparatus 2 to the image processor 3, making it possible for the image controller 34 of the image processor 3 to change the commanded values of the control data used for each imaging unit 21 to capture a next frame image properly depending on the operating conditions of the corresponding imaging unit 21. This achieves a first advantageous effect of obtaining higher quality frame images.

In addition, the imaging apparatus 2 of the image processing system 1 transmits each of the image data A captured by the first imaging unit 21a and the image data B captured by the second imaging unit 21b while the data segments A1 to A6 of the first image data A and the data segments to B1 to B6 of the second image data B are mixed to each other in time-division multiple transmission.

This enables the image processor 3 to perform a desired task, such as the HDR combination task, to at least one pair of data segments Ai and Bi in the data segments A1 to A6 and B1 to B6 where i represents any one of 1 to 6 when at least one pair of data segments Ai and Bi have been received.

As illustrated in FIG. 5, a comparison example shows that the desired task, such as the HDR combination task (see HDR in FIG. 5), is applied to the image data A and image data B when the image data A and image data B have been received at time t1. If the length of time required for the image processor 3 to have completed the desired task, such as the HDR combination task, based on the image data A and image data B is referred to as TL, a total time TA represented as (t1+TL) is required until the desired task, such as the HDR combination task, based on the image data A and image data B is completed.

In contrast, if the length of time required for the image processor 3 to have completed the desired task, such as the HDR combination task, based on the pair of the data blocks Ai and Bi is referred to as TL1, the length of time TL1 is shorter than the length of time TL. For this reason, a total time TB, which is shorter than the total time TA, is required until the desired task, such as the HDR combination task, based on the first embedded image data M and the second embedded image data M2 is completed.

This therefore results in, as a second advantageous effect, the shorter time required for the image processor 3 to have completed the desired task, such as the HDR combination task, based on the first embedded image data M1 and the second embedded image data M2.

Second Embodiment

Figure 6:
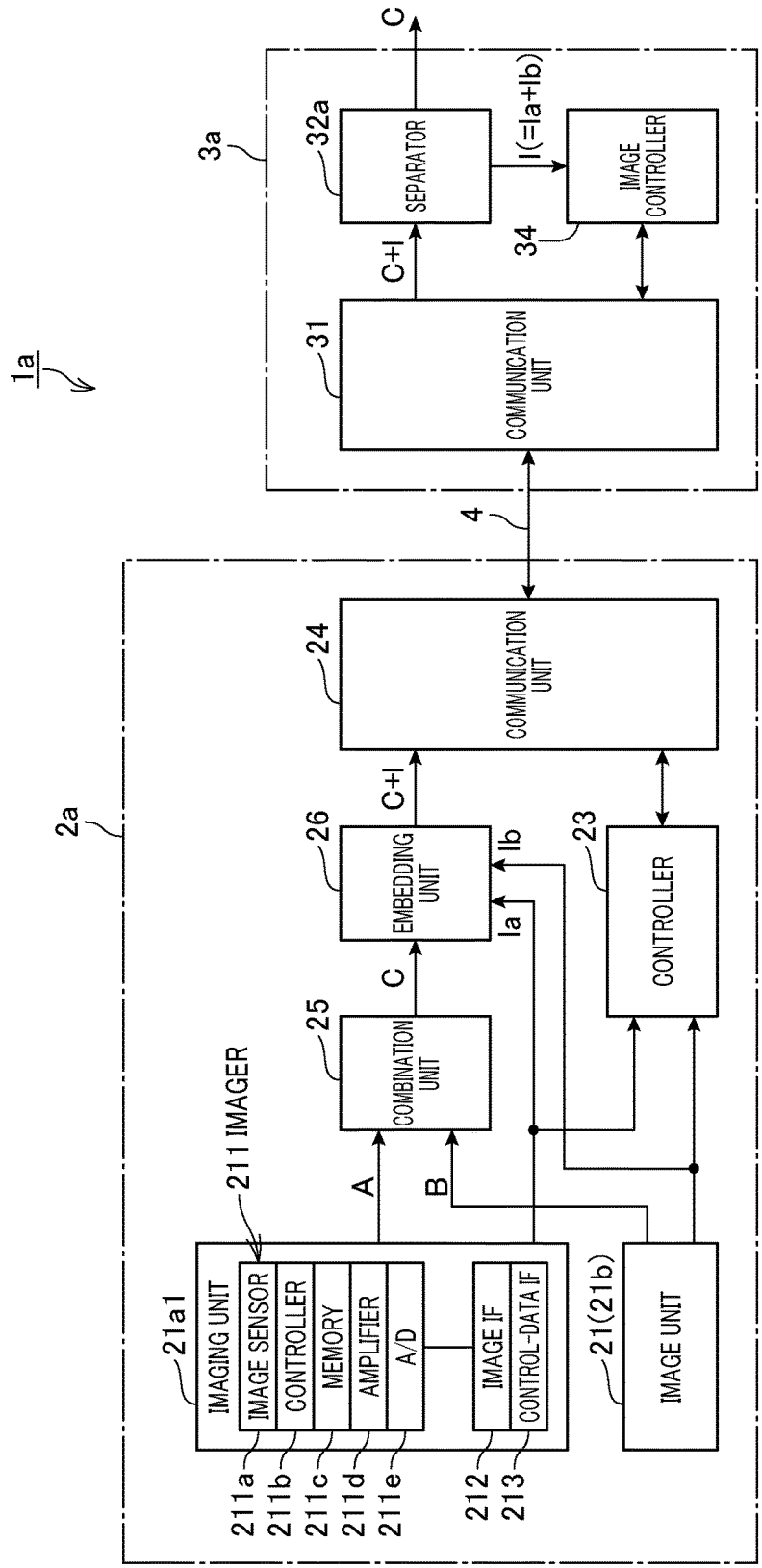
FIG. 6 is a block diagram schematically illustrating an example of the overall structure of an image processing system according to the second embodiment of the present disclosure.

The following describes the second embodiment of the present disclosure with reference to FIG. 6.

An image processing system 1a according to the second embodiment differs from the image processing system 1 in the following points. So, the following mainly describes the different points of the image processing system 1a according to the second embodiment, and omits or simplifies descriptions of like parts between the first and second embodiments, to which identical or like reference characters are assigned, thus eliminating redundant description.

The imaging apparatus 2 according to the second embodiment is configured to

1. Mix the first image data (A+Ia) and the second image data (B+Ib) with each other to generate the first embedded image data M embedded with the condition data Ia, and the second embedded image data M2 embedded with the condition data Ib 2. Transmit the first embedded image data M1 and second embedded image data M2 to the image processor 3

In contrast, an imaging apparatus 2a of the image processing system 1a according to the second embodiment is configured to perform the HDR combination task to combine the image data A and the image data B, thus generating HDR composite image data C. Then, the imaging apparatus 2a is configured to embed the condition data Ia and the condition data Ib into the HDR composite image data C to thereby generate embedded image data, referred to as (C+I), and transmit the embedded image data (C+I) to an image processor 3a of the image processing system 1a.

Specifically, referring to FIG. 6, the image processing system 1a includes the imaging apparatus 2a, the image processor 3a, and the communication line 4.

The imaging apparatus 2a includes at least two imaging units 21a1 and 21b1, the controller 23, the communication unit 24, a combination unit 25, and an embedding unit 26.

The imaging units 21a1 and 21b1 have the same structure as each other, so that the following describes only the imaging unit 21a1.

The imaging unit 21a1 is comprised of the imager 211, the image interface 212, and a control-data interface 213. That is, as compared with the imaging unit 21, the embedding unit 214 has been eliminated from the imaging unit 21a1. The image data A output from the imaging unit 21a1 does not contain the condition data Ia, and the image data B output from the imaging unit 21b1 does not contain the condition data Ib.

In particular, the control-data interface 213a of the imaging unit 21al is configured to detect the operating conditions of the imager 211, convert the operating conditions of the imager 211 into condition data Ia comprised of digital data values, and transfer the condition data Ia to the embedding unit 26. Similarly, the control-data interface 213a of the imaging unit 21b1 is configured to detect the operating conditions of the imager 211, convert the operating conditions of the imager 211 into condition data Ib comprised of digital data values, and transfer the condition data Ib to the embedding unit 26.

The combination unit 25 is configured to receive the image data A supplied from the imaging unit 21a1 and the image data B supplied from the imaging unit 21b1. Then, the combination unit 25 is configured to perform the HDR combination task to combine the image data A captured during the first shutter time with the image data B captured with the second shutter time shorter than the first shutter time.

Specifically, the HDR combination task is configured to

1. Divide the total luminance-level range of the image data A and the image data B into at least two different first and second luminance-level ranges; the second luminance-level range is higher than the first luminance-level range 2. Combine the digital pixel values of the image data A and the digital pixel values of the image data B such that a relationship between each luminance level and a corresponding digital pixel value within the first luminance-level range in the image data A and image data B is different from a relationship between each luminance level and a corresponding digital pixel value within the second luminance-level range in the image data A and image data B. This HDR combination task generates the HDR composite image data C.

The embedding unit 26, which serves as, for example, a collective embedder, is configured to receive the condition data Ia supplied from the control-data interface 213 of the imaging unit 21a1 and the condition data Ib supplied from the control-data interface 213 of the imaging unit 21b1. Then, the embedding unit 26 is configured to embed the condition data Ia and the condition data Ib into the HDR composite image data C in the same manner as the embedding unit 214 that embeds the condition data Ia into the image data A, and embeds the condition data Ib into the image data IB. This embedding operation results in the embedded image data (C+I) being generated.

The communication unit 24 is configured to transmit, via the communication line 4, the embedded image data (C+I) to the image processor 3a in accordance with the frame intervals.

The image processor 3a includes the communication unit 31, a separator 32a, and the imaging controller 34.

When receiving the embedded image data (C+I) transmitted from the imaging apparatus 1a, the separator 32a is configured to 1. Separate the condition data Ia embedded in the embedded image data (C+I) from the embedded image data (C+I)

2. Separate the condition data Ib embedded in the embedded image data (C+I) from the embedded image data (C+I)

3. Correspondingly generate the HDR composite image data C, thus outputting the HDR composite image data C to an external circuit, such as an ECU.

Like the first embodiment, the separator 32a transfers the separated condition data Ia and the separated control data Ib to the image controller 34. The separator 32a can also be configured to 1. Extract, from the embedded image data (C+I), first image information indicative of, for example, the average luminance level of the image data A; the first image information depends on the control data for the first imaging unit 21a1

2. Transfer the first image information to the image controller 34 together with the condition data Ia 3. Extract, from the embedded image data (C+I), second image information indicative of, for example, the average luminance level of the image data B; the second image information depends on the control data for the second imaging unit 21b1

4. Transfer the second image information to the image controller 34 together with the condition data Ib.

The following describes advantageous effects achieved by the image processing system 1a.

As described above, the imaging apparatus 2a of the image processing system 1a performs the HDR combination task in each of the first and second imaging units 21a and 21b1 to thereby generate the embedded image data (C+I), and transmits, via the communication line 4, the embedded image data (C+I) to the image processor 3a.

This configuration therefore achieves, in addition to the first advantageous effect, a third advantageous effect of resulting in large reduction of the amount of communication data between the imaging apparatus 2a and the image processor 3a via the communication line 4.

The present disclosure is not limited to the descriptions of the first and second embodiments, and the descriptions of each embodiment can be widely modified within the scope of the present disclosure.

The embedding unit 214 according to the first embodiment is installed in the imaging unit 21, but the embedding unit 214 can be provided separately from the imaging unit 21. In this modification, the embedding unit 214 can be provided between the imaging unit 21 and the mixer 22.

Each of the imaging apparatuses 2 and 2a includes two imaging units 21a and 21b (imaging units 21a1 and 21b1), but the number of imaging units is not limited to two. Specifically, each of the imaging apparatuses 2 and 2a can include three or more imaging units. In particular, the imaging apparatus 2 can include a single imaging apparatus 21. In this modification, the mixer 22 can be eliminated from the imaging apparatus 21.

The functions of one element in each embodiment can be distributed as plural elements, and the functions that plural elements have can be combined into one element. At least part of the structure of each embodiment can be replaced with a known structure having the same function as the at least part of the structure of the corresponding embodiment. A part of the structure of each embodiment can be eliminated. All aspects included in the technological ideas specified by the language employed by the claims constitute embodiments of the present disclosure.

The present disclosure can be implemented by various embodiments in addition to the imaging apparatuses 2 and 2a; the various embodiments include systems each including the image generating apparatus 2 or 2a, programs for serving a computer as the mixer 22 and the communication unit 24 of the imaging apparatus 2 or as the combination unit 25 and the embedding unit 26 of the imaging apparatus 2a, storage media, such as non-transitory media, storing the programs, and imaging methods.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An imaging apparatus comprising:

at least one imaging unit configured to perform a capturing task to capture image data in accordance with control data;

an embedding unit configured to embed, into the image data, condition data indicative of an operating condition of the imaging unit, thus generating embedded image data; and a communication unit configured to perform serial communications with an external device to thereby:

receive the control data from the external device; and transmit the embedded image data to the external device, wherein:

the at least one imaging unit comprises first and second imaging units, the first imaging unit being configured to perform the capturing task to capture first image data as the image data in accordance with the control data, the second imaging unit being configured to perform the capturing task to capture second image data as the image data in accordance with the control data; and the embedding unit comprises:

an embedder configured to:

embed, into the first image data, first condition data as the condition data, thus generating first image data; and embed, into the second image data, second condition data as the condition data, thus generating second image data, the first condition data representing the operating condition of the first imaging unit, the second condition data representing the operating condition of the second imaging unit; and a mixer configured to:

divide the first image data into first data segments;

divide the second image data into second data segments; and mix at least part of the first data segments with at least part of the second data segments to correspondingly generate at least the embedded image data.

2. The imaging apparatus according to claim 1, wherein:

the embedder is configured to:

replace a part of the first image data with the first condition data to correspondingly embed the first condition data into the first image data; and replace a part of the second image data with the second condition data to correspondingly embed the second condition data into the second image data.

3. The imaging apparatus according to claim 1, wherein:
the embedder is configured to:
receive, from the first imaging unit, the first image data from a predetermined header portion of the first image data to a predetermined end portion of the first image data;
receive, from the second imaging unit, the second image data from a predetermined head portion of the second image data to a predetermined end portion of the second image data;
insert the first condition data into at least one of the head portion and end portion of the first image data to correspondingly embed the first condition data into the first image data; and
insert the second condition data into at least one of the head portion and end portion of the second image data to correspondingly embed the second condition data into the second image data.

4. The imaging apparatus according to claim 1, wherein:
the mixer is configured to:
perform multiple alternate selections of one of the first data segments and one of the second data segments; and
mix the selected first data segments with the selected second data segments to correspondingly generate at least the embedded image data.

5. An imaging apparatus comprising:
at least one imaging unit configured to perform a capturing task to capture image data in accordance with control data;
an embedding unit configured to embed, into the image data, condition data indicative of an operating condition of the imaging unit, thus generating embedded image data; and
a communication unit configured to perform serial communications with an external device to thereby:
receive the control data from the external device; and
transmit the embedded image data to the external device,
wherein:
the at least one imaging unit comprises first and second imaging units, the first imaging unit being configured to perform the capturing task to capture first image data as the image data in accordance with the control data, the second imaging unit being configured to perform the capturing task to capture second image data as the image data in accordance with the control data, each of the first image data and the second image data comprising pixels having pixel values each indicative of a corresponding luminance level; and
the embedding unit comprises:
a combination unit configured to:
divide a total luminance-level range of the first image data and the second image data into at least first and second luminance-level regions different from each other; and
combine the first image data with the second image data to thereby generate composite image data such that a relationship between each luminance level and a corresponding pixel value within the first luminance-level range is different from a relationship between each luminance level and a corresponding pixel value within the second luminance-level range; and
a collective embedder configured to embed first condition data as the condition data into the composite image data, and embed second condition data as the condition data into the composite image data, thus generating the embedded image data.

6. The imaging apparatus according to claim 5, wherein:
the collective embedder is configured to:
replace a part of the composite image data with the first condition data to correspondingly embed the first condition data into the composite image data; and
replace a part of the composite image data with the second condition data to correspondingly embed the second condition data into the composite image data.

7. The imaging apparatus according to claim 5, wherein:
the collective embedder is configured to:
receive, from the combination unit, the composite image data from a predetermined head portion of the composite image data to a predetermined end portion of the composite image data;
insert the first condition data into at least one of the head portion and end portion of the composite image data to correspondingly embed the first condition data into the composite image data; and
insert the second condition data into at least one of the head portion and end portion of the composite image data to correspondingly embed the second condition data into the composite image data.

8. The imaging apparatus according to claim 1, wherein:
the condition data of the at least one imaging unit is used to determine the control data for the at least one imaging unit.

9. An image processing system comprising:
an imaging apparatus;
an external device; and
a communication line communicably connecting between the imaging apparatus and the external device,
the imaging apparatus comprising:
at least one imaging unit configured to perform a capturing task to capture image data in accordance with at least one value of control data;
an embedding unit configured to embed, into the image data, condition data indicative of an operating condition of the imaging unit, thus generating embedded image data; and
a communication unit configured to perform serial communications with the external device via the communication line to thereby:
receive the control data from the external device; and
transmit the embedded image data to the external device; and
the external device comprising:
a separator configured to receive the embedded image data; and separate the condition data from the embedded image data,
wherein:
the external device comprises a controller configured to determine at least one updated value of the control data in accordance with the condition data separated from the embedded image data; and transmit the control data to the imaging apparatus via the communication line,
the communication unit being configured to receive the control data transmitted from the controller,
the at least one imaging unit being configured to change the at least one value of the control data to the at least one updated value of the control data received by the communication unit.

* * * * *